United States Patent [19]

Roessler

[11] Patent Number: 4,928,308
[45] Date of Patent: May 22, 1990

[54] ECHO CANCELLER CIRCUIT

[75] Inventor: Bernward Roessler, Munich, Fed. Rep. of Germany

[73] Assignee: Siemens Aktiengesellschaft, Berlin and Munich, Fed. Rep. of Germany

[21] Appl. No.: 287,569

[22] Filed: Dec. 16, 1988

Related U.S. Application Data

[63] Continuation of Ser. No. 906,363, Sep. 12, 1986, abandoned.

[30] Foreign Application Priority Data

Sep. 23, 1985 [DE] Fed. Rep. of Germany ....... 3533902

[51] Int. Cl.⁵ .............................................. H04B 3/23
[52] U.S. Cl. .................................. 379/411; 370/32.1
[58] Field of Search ................ 370/32.1, 32; 379/410, 379/411; 341/150, 172; 307/261, 355, 367

[56] References Cited

U.S. PATENT DOCUMENTS

| | | | |
|---|---|---|---|
| 4,195,282 | 3/1980 | Cameron | 340/347 AD |
| 4,200,863 | 4/1980 | Hodges et al. | 340/347 AD |
| 4,517,549 | 5/1985 | Tsukakoshi | 340/347 AD |
| 4,661,802 | 4/1987 | Yukawa | 341/150 |
| 4,669,116 | 5/1987 | Agazzi et al. | 379/411 |
| 4,764,753 | 8/1988 | Yukawa | 341/172 X |

OTHER PUBLICATIONS

O. E. Agazzi, "Large Scale Integration of Hybrid-Method Digital Subscriber Loops", Dissertation Univ. Ca. Berkeley; 5/20/82, pp. 161, 168, 169, 170, and 171.

"Hybrid with Automatic Selection of Balance Networks", A. de la Plaza, Conference, 1981 IEE Int. Symposium on Circuits and Systems, Chicago, Ill., 27-29 Apr. 1981, pp. 725-8.

Primary Examiner—Jin F. Ng
Assistant Examiner—Randall S. Vaas
Attorney, Agent, or Firm—Adel A. Ahmed

[57] ABSTRACT

An echo canceller circuit contains a network of capacitors binary-stepped in their capacitance, whose one set of plates, representing a center of the network, each are switchably connectable to a reference potential or, in the case of less significant bits of digital information to be converted, to ground potential, or to a fraction (U3, U4) of the reference potential. To avoid difficulties which might result from the offset voltage of an integrated operational amplifier (V) connected to the capacitor network, the network is composed of two symmetrical halves (COo' to C32o; COn' to 32n).

3 Claims, 2 Drawing Sheets

ECHO CANCELLER CIRCUIT

CROSS-REFERENCE TO RELATED APPLICATION

This is a continuation of Ser. No. 06/906,363 filed Sept. 12, 1986, now abandoned.

BACKGROUND OF THE INVENTION

The invention relates to a circuit arrangement for echo cancellation including a network of capacitors which take part in digital to analog conversion of digital compensation signals supplied by an adaptive transversal filter, in the subtraction of such compensation signals converted to analog signals from echo-laden wanted signals, and also in the analog to digital conversion—done by the iterative method—of the resultant signals from the compensation process which may be laden with a residual echo signal for provision to the transversal filter as a digital correction signal. The upper plates of the capacitor network, forming one terminal of the network, are connected together, and further, insofar as they are correlated with a bit of a group of the more significant bits of the digital signals to be processed, are binary-stepped in their capacitance and can be switched by their lower plates forming separate terminals of the network selectively to ground potential or to a reference potential, or, insofar as they are correlated to bits of a group of the less significant bits of such digital signals, can be applied by their lower plates selectively to ground potential or to a fraction of this reference voltage potential corresponding to the bit combinations of the correlated less significant bits.

A circuit of this kind is known from E. Agazzi's publication "Large Scale Integration of Hybrid Message Digital Subscriber Loops", a dissertation at the University of California in Berkely California, dated May 20, 1982, and comes quite close to meeting the requirements of an ideal echo canceller. These requirements include that, because of the high scanning rate, which is double the bit rate of the digital signals, within the cycle time of, for example, 3.1 microseconds, as low as possible a number of successive processes should be performed. Further it is required that the digital to analog converter has a monotonic converter characteristic, which moreover shows only slight nonlinearities. The resolution for positive and negative signal amplitudes should be at least 12 bits including the sign bit; for the analog to digital conversion of the residual signal, a resolution of up to 8 bits is required for a short adaptation time of the echo canceller. Balancing processes, which constitute a major cost factor, should be avoided. Lastly it is desirable that such an echo canceller, or respectively the analog section thereof, to which the above-described capacitor network belongs, should be realized with a minimum of chip surface in CMOS technology.

The known circuit arrangement, unlike other known circuit arrangements operating with capacitor networks, is able, as indicated, to subject any residual signal that may remain after a compensation process to an analog to digital conversion in order to obtain a digital correction signal for the transversal filter of the compensation circuit. However, the digital correction signal is developed from an additional capacitor which is not correlated with the most significant bit and serves for storing the signal voltage.

In the known circuit arrangement, a comparator in the form of an operational amplifier is, as indicated, connected to the capacitor network. In order to make the evaluation of the voltage values, to which the capacitors of the network become charged, independent of the offset voltage of the operational amplifier by this comparator, the offset voltage is either stored during the sampling of the input voltage of the capacitor network, that is, of the echo-laden wanted signal voltage on the binary-stepped capacitors of the network, in that the input and output of the operational amplifier are connected to one another, or else the input of the comparator is grounded and thus the offset voltage stored on a capacitor formed from capacitive parameters of the comparator. The circuits used for this are transistor switches. In both methods of taking the offset voltage into consideration, with the closing of the respective switching transistors through the gate to drain capacitance, charge is drawn and thereby the potential at the comparator input is changed, which may lead to faulty comparison results. Also capacitive coupling-in of interference voltages onto the comparator input may lead to interferences.

The object of the invention therefore is to design an echo canceller circuit of the above-mentioned kind so that such disadvantageous effects are excluded.

SUMMARY OF THE INVENTION

According to the invention, these problems of the prior art are solved in that the capacitor network of such a circuit arrangement consists of two symmetrical halves which are equal with respect to construction and dimensioning of the capacitors, and which, apart from the mentioned capacitors, comprise an additional capacitor with twice as high a capacitance as that of the capacitor with the highest binary-stepped capacitance, which is switchable in the same manner as the capacitors correlated with the group of more significant bits, as well as a scanning capacitor of the same capacitance as that of the known additional capacitor, via which the wanted signals are supplied to the network in one case in the original form and in the other case in phase opposition thereto. In the two network halves, the central bank of terminals of equi-ordered capacitors as shown in the figure, insofar as they are correlated to bits of the group of more significant bits, are applied oppositely to ground potential or to reference potential, and that the upper or lower ends of each network half are connected to one another and to the two inputs of the respective comparator.

Because of such type of symmetrical construction of capacitor network, the mentioned interferences have no effect on the compensation result.

According to another variant of the invention, an operational amplifier serving to relay the compensated analog signals and composed of CMOS semiconductor switching elements is coupled by its inputs capacitively to the upper or lower ends of the capacitor network halves respectively and comprises capacitive feedback branches between its output and its two inputs. By this measure another problem which results from the circuit realization in semiconductor technology, namely the necessity of having to meet the common-mode requirements, is solved, as such requirements can here be dropped. At the same time, the operational amplifier thus connected can be utilized as a holding element, which is the operation of such an echo canceller circuit, would have to exist anyway.

In the following, the invention will be explained more specifically by way of an embodiment with reference to be a drawing, taking as assumed a mode of operation which makes sure that nonlinearities of even-numbered order and non-monotonic behavior at the zero point of the digital to analog converter characteristic due to tolerances of binary-stepped capacitances can no longer occur.

DETAILED DESCRIPTION

Figure 1:
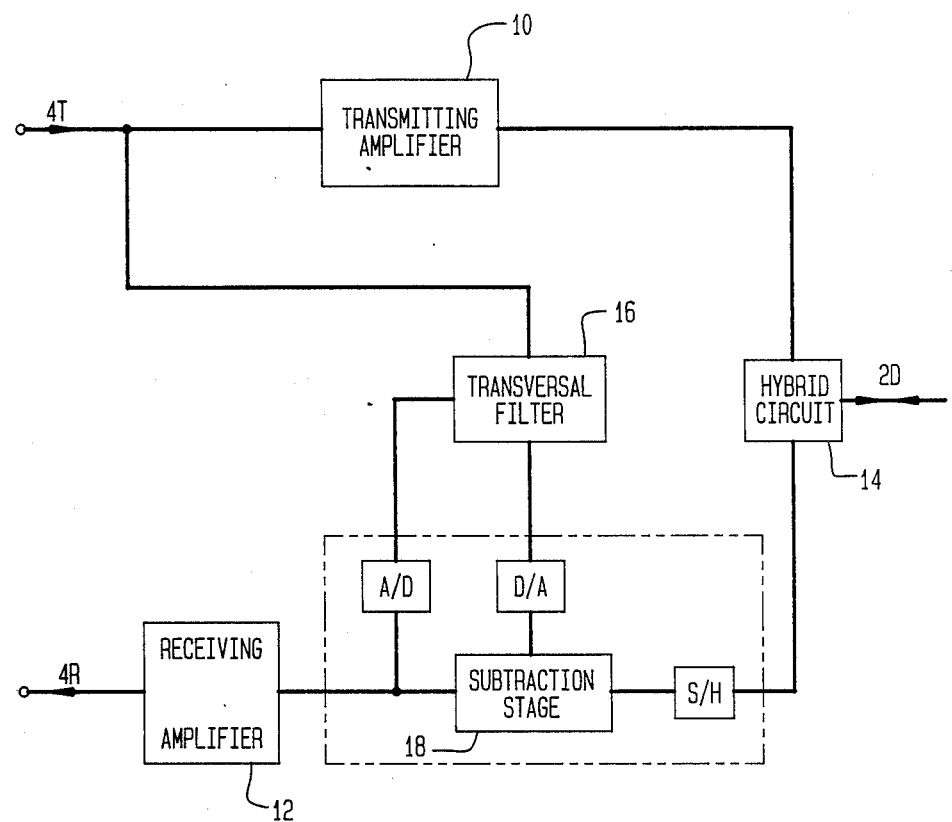
FIG. 1 shows a general block diagram of an echo canceller circuit according to the invention.

In FIG. 1, T denotes a transmitting amplifier lying in the transmission branch 4T of a four-wire line, and R, a receiving amplifier lying in the reception branch 4R of this four-wire line. The branches of the four-wire line are connected to a two-wire line 2D via a hybrid circuit G for the two-wire to four-wire transition.

Because of an insufficiently high hybrid attenuation at the hybrid circuit G, it may happen that data arriving on the four-wire line branch 4T which are intended to be relayed on a two-wire line 2D are transferred in part to the receiving branch 4R of the four-wire line as echo, so that the signals occurring there are a mixture of wanted signals originating from the two-wire line 2D and unwanted echo signals.

The echo canceller described in the following description serves to eliminate such unwanted echo signals. It here consists of a digital adaptive transversal filter Tr, which is provided the signal that arrives on the transmission branch 4T of the four-wire line and is intended to be relayed to the two-wire line 2D. The transversal filter generates a digital compensation signal corresponding to that signal. The echo canceller further comprises the dashed line box of FIG. 1. By a digital to analog converter D/A, the digital compensation output signal of the filter is transformed into an analog signal. Another component of the box is a sample and hold circuit S/H which samples the echo-laden wanted signal referred to above. The signal delivered by the sample and hold circuit and the analog compensation signal are superposed on each other in a subtraction stage S in such a way that the echo component in the echo laden-wanted signal is ideally cancelled.

Normally, however, the output signal of the subtraction stage, which is relayed as the received signal to the reception amplifier R and then to the reception branch 4R of the four-wire line, also contains a residual echo signal. The output of subtractor S must therefore be supplied in addition to an analog to digital converter A/D, which makes available to the transversal filter a corresponding digital signal, which serves as a correction signal for adaptive adjustment of the transversal filter and accordingly leads to a correction of the compensation signal.

Figure 2:
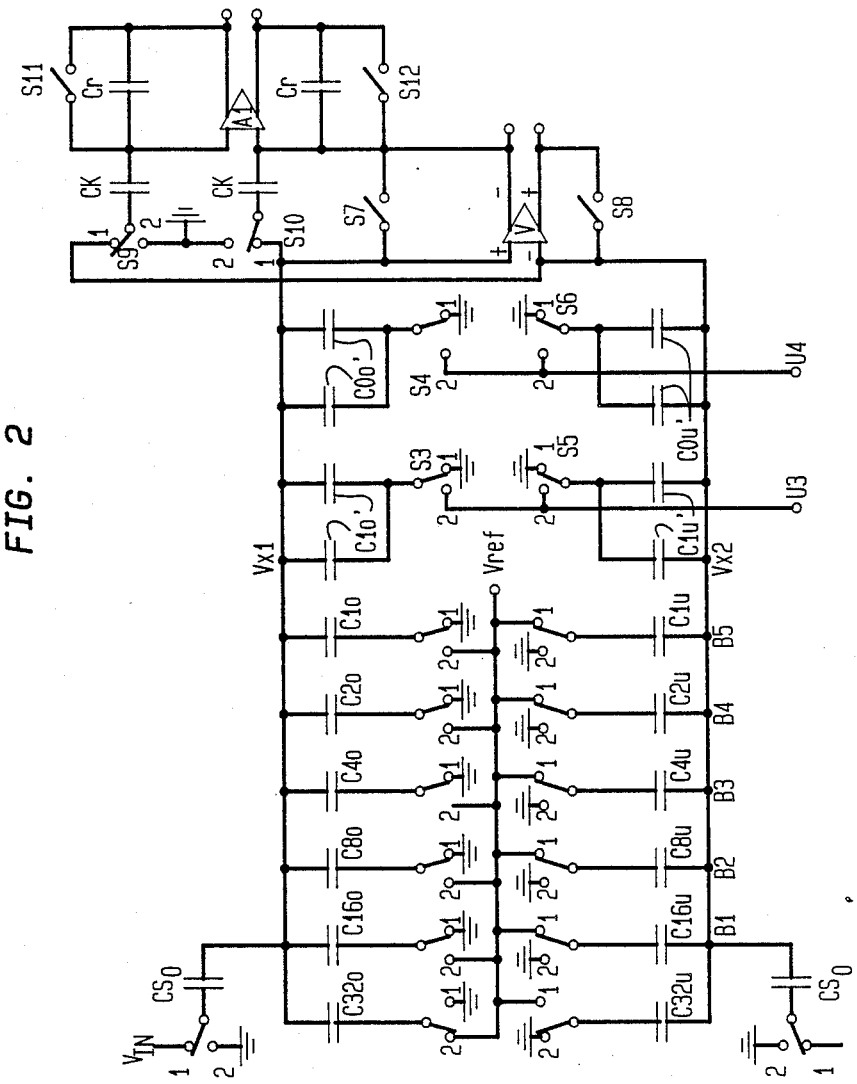
FIG. 2 shows a detailed schematic drawing including the capacitor network of such a circuit constructed according to the invention.

In the figure, the sample and hold circuit S/H, the subtraction element S, the digital to analog converter D/A and the analog to digital converter are marked by a dash-line box as those parts of the echo canceller whose functions are realized in an echo canceller of the kind from which the invention proceeds from a switched network of binary-stepped capacitors as shown in FIG. 2.

The capacitor network according to the invention consists of two halves, one of which comprises the capacitors $C0o'$ to $C32o$ and the other capacitors $C0u'$ to $C32u$. The two halves resemble each other with respect to construction and dimensioning of the capacitors.

Of the capacitors referred to, the capacitors $C1o$ to $C16o$ of the upper half and the capacitors $C1u$ to $16u$ of the lower half are correlated to the more significant bits of digital signals forming the compensation signal output of the filter and are to be subjected to digital to analog conversion. The capacitance of these capacitors in binary-stepped, starting with the capacitors $c1o$ and $c1u$, respectively, that is, each is half as great as the capacitance of the adjacent capacitor, that is, here of capacitor $C2o$ and $C2u$, respectively, and so on.

In addition, the two network halves comprise an additional capacitor $C32o$ and $C32u$, respectively, the capacitance of which is twice as great as that of the capacitor $C16o$, $C16u$ associated with the most significant bit.

Referring to FIG. 2, the plates of the capacitors $C1o$ to $C32o$ and $C1u$ to $C32u$, respectively, which form the upper or lower ends of the network halves respectively, are all connected together. The other plates of the capacitors $C1o$ to $C32o$ and $C1u$ to $C32u$, which represent the center of the network halves, are connectable via switches selectively to either ground potential or to a reference voltage potential Vref.

The capacitors $C1o'$ in the upper network half and, respectively, $C1u'$ in the lower network half, are associated with three less significant bits of digital signals to be processed which in their significance follow said more significant bits. The equivalent is true of the capacitors $C0o'$ in the upper network half and the capacitors $C0u'$ in the lower network half associated with the three least significant bits of the digital signals to be processed. The capacitance ratio of the $C1o'$ and $C0o'$ is 8/1; the same is true for the similar capacitors in the lower network half.

Also in the case of these capacitors, the plates forming upper or lower ends of the network halves respectively are connected with one another and with the respective plates of the other capacitors. The central bank of plates of the two halves can be connected selectively to ground potential or in the case of the capacitors $C1o'$ and $C1u'$ to a reference potential U3 and in the case of the capacitors $C0o'$ and $C0u'$ to a reference potential U4. The reference potentials U3 and U4 are, in contrast to the aforementioned reference potential Vref, not a fixed value but have different values depending on the significance of the binary character combination of the associated bits of lower significance, these potentials being binary-stepped components of the reference voltage Vref. These partial voltages are supplied by means of a voltage divider not shown here, operated between the reference voltage Vref and ground potential, which voltage divider has correspondingly switchable taps.

The upper terminals or plates of the capacitors in the upper network half are connected to a sampling capacitor CSo, the other plate of which can be connected selectively to ground potential or to the wanted signal voltage Vin+, that is, to the analog voltage which according to FIG. 1 is to be subjected to an analog to digital conversion. The equivalent applies to the interconnected lower plates of the capacitors of the lower network half or respectively of a sampling capacitor CSu, which is switchable between ground potential and a voltage Vin−, which is in phase opposition to said voltage Vin+.

The upper plates of the capacitors of the upper network half are furthermore connected to the non-inverting input of the comparator V, while the corresponding plates of the lower half of the network are connected to the inverting input of this comparator which, as will be explained later, is of importance in connection with an analog to digital conversion carried out by the iterative method in the cancellation process. The outputs of this comparator are connectable via switches S7, S8 and its inputs. These switches are closed during the sampling of the input voltage Vin+, Vin− in order to make the evaluation by the comparator independent of the latter's offset voltage. Such an effect could be achieved by grounding the inputs of the comparator and storing the offset voltage on one or more capacitors forming part of the comparator. The switches S7, S8 are realized by CMOS switching transistors.

Coupled to upper/lower terminals of the network halves is further, by its inputs, an operational amplifier A1, which assumes the role of the amplifier R in FIG. 1. The coupling is done via switches S9 and S10, also realized by transistor switches in practice, and via capacitors Ck. In their other position, the switches S9 and S10 establish a connection of the amplifier inputs with a circuit point carrying ground potential. Between the outputs of the operational amplifier A1 and the inputs thereof a feedback connection exists via capacitors Cr. These capacitors can be bridged by switches S11 and S12 also realized in the form of transistor switches. The particularity of the connection of the amplifier A1 consists in the capacitive coupling as well as in the purely capacitive feedback branches. The amplifier can thus be utilized as a hold element and so one can adjust to a low gain required with respect to the load on the capacitor network without having to respect common-mode requirements regarding the CMOS transistors contained in the amplifier, as would be the case with an ohmic component of the feedback branch.

In the following detailed description, the mode of operation of the circuit arrangement according to FIG. 2 is discussed in detail.

It is assumed in the first place that a wanted signal laden with a positive echo signal is present at the network input Vin+.

In a first time step, which serves for the sampling of the wanted signal voltage and at the same time for the digital to analog conversion of the compensation signal, whereby the functions of the circuit parts S/H and D/A per FIG. 1 are realized, the following switch positions occur:

Switches S1 and S2 occupy position 1, whereby the wanted signal voltage Vin+ and Vin− is provided to capacitors of the network. Of these capacitors, those associated with bits with binary value 1 of the compensation signal to be subjected to a digital to analog conversion are applied with their low ends switched to ground potential (position 1 of the respective low-end switches). In the assumed case of positive echo signals, the low ends of the capacitors C1o' and C0o' are connected to ground potential (position 1). The switches S7 and S8 as well as S11 and S12 are closed, and the switches S9 and S10 connect the amplifier inputs of amplifier A1 to ground potential (position 2).

The central bank of terminals of the capacitors of the lower network half, insofar as they are correlated with more significant bits, are connected in this time step to ground potential or to the reference voltage Vref oppositely to the low ends of the corresponding capacitors of the upper network half. At variance therewith, the low-end switches S5, S6 of the capacitors C1u' and C0u' of the lower network half occupy the same position as the corresponding low-end switches of the upper network half, that is, these low ends are also connected to ground potential.

In the second time step, the low-end switches of the capacitors of the upper network half are connected to reference voltage potential Vref (position 2), unless this is the case already, the low-end switch of capacitor C32o remaining at ground potential unchanged (position 1). At the central bank of terminals of the capacitors of the lower network half, insofar as it concerns the capacitors correlated to more significant bits after the second time step, the terminals are connected to the respective other voltage than are connected the terminals of the corresponding capacitor in the upper network half. At the end of the second time step, the switches S3 and S5 or respectively S4 and S6 connect the corresponding low ends to ground potential. In this manner, the low ends of the capacitors C1o', C0o', C1u' and C0u' are connected to ground potential.

At the high ends of the capacitors of the upper network half, there prevails thereafter a voltage Vx1 and at the lower ends of the capacitors of the lower network half an equally high voltage Vx2, where Vx1 = −Vx2.

For the cancellation of a positive echo, therefore, $Vx1 + Vx2 = (-Vin \ C32' + 2Vref \ (B1.C16 + B2.C8 + B3.C4 + B4.C2 + B5.C1) + 2U3 \ C1' + 2U4 \ C0') : CT$, where CT denotes the sum of the capacitance of all capacitors of a network half.

In the cancellation of negative echoes, one operates with interchanged switch positions. This means that in the upper network half the low ends of those capacitors which are correlated with bits of the binary value 1 are connected to the reference voltage Vref, whereas the low ends of capacitors correlated with bits of binary value 1 are connected to ground potential. The central terminals of the capacitors C1o' and C0o' are connected to the reference partial voltages U3 and U4. In the lower network half, the switches S5 and S6 connect with ground potential, while at the central bank of terminals of the capacitors C1u to C16u correlated to more significant bits, reversed conditions prevail accordingly. The additional capacitor C32o of the upper network half is connected in the first time step to the reference voltage Vref, the additional capacitor C32u belonging to the lower network half, to ground potential.

In the second time step, in the discussed case of negative echoes, the low-end switches of the capacitors C1o to C16o are connected to ground potential, the switches of the corresponding capacitors of the lower network half to the reference voltage Vref. The switch position of the switches at the low ends C32o and C32u remains unchanged. Accordingly there applies for negative echoes $$V \times 1 + V \times 2 = (+2Vin \ C32' - 2Vref \ (B1.C16 + B2.C8 + B3.C4 + B4.C2 + B5.C1) - 2U3 \ C1' + U4 \ C0') : CT.$$

As the contributions to a positive echo cancellation voltage are supplied to the same capacitors as the contributions to a negative echo cancellation voltage, they are necessarilly identical independently of tolerances of the capacitance ratios. The D/A converter characteristic is therefore zero point-symmetrical, and non-linearities of even-numbered order cannot occur. The monotonic behavior is largely undisturbed, as the capacitors C32o and C32u do not actively participate in the conversion process.

A third time step in the operation of the capacitor network according to the invention forms part of the analog to digital conversion of the residual signal remaining after the compensation and serves in particular to determine the sign of this residual signal. To reduce quantization errors, in the case of a positive echo, the low end of the capacitors C1o' is switched to the partial reference voltage U3 and the low end of the capacitors C0o' to the partial reference voltage U4, the fraction of the reference voltage Vref which these voltages U3 and U4 represent being determined by a random address formed by the six bits of lowest significance. The central terminals of the corresponding capacitors C1u' and C0u' in the lower network half are connected to ground potential by the switches S5 and S6. Again according to a random address, individual low ends of the capacitors of the upper network half correlated with more significant bits are connected to the reference voltage Vref, whereas the terminals of the corresponding capacitors in the lower network half are connected to ground potential. This procedure is referred to also as "dithering".

If, as has been assumed, there is a positive echo to be cancelled, and if the sum of the residual signal voltage remaining after compensation and of the additional charge voltage resulting on the basis of the dithering is positive at the end of the third time step, then the low-end switch of the capacitor C16o correlated to the most significant bit in the upper network half is switched from the reference voltage Vref to ground potential. Conversely at the corresponding capacitor C16u in the lower network half switching from ground potential to reference voltage potential Vref is effected in a fourth time step. If at the end of this fourth time step sum voltage is still positive, then switches of the capacitors C16o and C16u remain in the position set in the fourth time step. But if at the end of the fourth time step it results that the sum voltage is negative, both switches of the capacitors C16o and C16u are set back again.

In a time step 5 or respectively in further subsequent time steps, one proceeds accordingly with the capacitors nearest in significance successively.

The explained mode of operation is based on the principle that in the case of overcompensation, that is, at positive echo signal and resulting positive sum voltage, or at negative echo and resulting negative sum voltage, the capacitors C32o, C32u do not participate in the conversion processes. In case of undercompensation, that is at positive echo and resulting negative sum voltage or at negative echo and resulting positive sum voltage, the capacitors C32o and C32u do participate in like manner in both cases. As a result, no nonlinearities of even-numbered order occur in the analog to digital conversion.

The initially described influences of capacitances of the switches S7, S8, S11 and S12 compensate each other because of the symmetrical construction of the capacitor network and thus cannot influence the compensation result.

Thus there has been shown and described a novel echo canceller circuit including a symmetrical capacitor network which meets the objectives of the present invention only limited in scope by the claims which follow.

What is claimed is:

1. A circuit for cancellation of echoes including a network of capacitors which takes part in digital to analog conversion of digital compensation signals supplied by an adpative transversal filter, in a compensation process comprising the subtraction of such compensation signals converted to analog signals from the echo-laden wanted signals supplied to said circuit, and in the analog to digital conversion of the resultant signal resulting from the compensation process which may be laden with a residual echo signal, said resultant signal to be supplied to the transversal filter as a digital correction signal, an upper set of capacitor plates of the network being connected together, and said network including capacitors corresponding with more significant bits of said digital compensation signals which are binary-weighted in their capacitance and switched by their other plates forming separate terminals of the network selectively either to ground potential or to a reference potential, and capacitors corresponding to less significant bits than said more significant bits of said digital compensation signals which are switchable by their lower plates selectively to ground potential or to fractions of the reference voltage potential, said fractions corresponding to the bit combinations of the less significant bits, characterized in that the capacitor network comprises two symmetrical halves, said halves being equal with respect to their construction and with respect to capacitance and correspondence with bits of said digital compensation signals (C0o', C1o' . . . C32o, CSo; C0u', C1u' . . . C32u', CSu), and said halves respectively comprising an additional capacitor (C32o, C32u), which additional capacitor is also switchable to ground potential or to a reference potential by one plate thereof while its other plate in connected together with the upper set of plates of said network of capacitors, as well as a scanning capacitor (CSo, CSu) of the same capacitance as that of the additional capacitor, the echo-laden wanted signals being supplied by way of said additional capacitor and by way of said scanning capacitor to the network, in the case of said additional capacitor said signals being supplied in the form as supplied to said circuit and in the case of said scanning capacitor in phase opposition thereto, and in which each of said other plates of said capacitors in said similarly arranged and valued network halves and corresponding to the more significant bits in one network half are applied to a different one of (a) ground potential and (b) reference potential than the corresponding capacitor of the other network half, and that a respective end of each network half associated with said plates connected together is connected to respective inputs of a comparator (V) comprising an operational amplifier having outputs respectively connectable to a respective one of said comparator inputs by means of a semiconductor switch.

2. A circuit for cancellation of echoes according to claim 1 further characterized in that a second operational amplifier (A1) for relaying compensated analog output signals of said comparator and constructed from CMOS transistors is coupled by its inputs capacitively (Ck) to the respective plates connected together of the capacitor network halves and comprises purely capacitive feedback branches (Cr) between its outputs and its two inputs.

3. A circuit for cancellation of echoes according to claim 2 further characterized in that capacitors in said feedback branches of said second operational amplifier are selectively shunted by semiconductor switches and respective inputs of said second operational amplifier are switchable from the respective capacitor plates connected together to a circuit point carrying ground potential by way of further semiconductor switches.

* * * * *